US010947094B2

United States Patent
Maghsoodi

(10) Patent No.: US 10,947,094 B2
(45) Date of Patent: Mar. 16, 2021

(54) AUXILIARY BRAKE ASSEMBLY

(71) Applicant: GOODRICH CORPORATION, Charlotte, NC (US)

(72) Inventor: Bejan Maghsoodi, San Dimas, CA (US)

(73) Assignee: Goodrich Corporation, Charlotte, NC (US)

( * ) Notice: Subject to any disclaimer, the term of this patent is extended or adjusted under 35 U.S.C. 154(b) by 86 days.

(21) Appl. No.: 16/532,358

(22) Filed: Aug. 5, 2019

(65) Prior Publication Data
US 2021/0039928 A1    Feb. 11, 2021

(51) Int. Cl.
| | |
|---|---|
| *B66D 1/16* | (2006.01) |
| *B66D 5/14* | (2006.01) |
| *F16D 55/38* | (2006.01) |
| *B66D 5/30* | (2006.01) |
| *F16D 65/18* | (2006.01) |
| *F16D 127/02* | (2012.01) |
| *F16D 121/24* | (2012.01) |

(52) U.S. Cl.
CPC ............... *B66D 5/14* (2013.01); *B66D 1/16* (2013.01); *B66D 5/30* (2013.01); *F16D 55/38* (2013.01); *F16D 65/186* (2013.01); *F16D 2121/24* (2013.01); *F16D 2127/02* (2013.01)

(58) Field of Classification Search
CPC ... B66D 1/14; B66D 1/16; B66D 5/14; B66D 5/30; F16D 55/38; F16D 65/186; F16D 2121/24; F16D 2127/02; F16D 2127/04
See application file for complete search history.

(56) References Cited

U.S. PATENT DOCUMENTS

| | | | | | |
|---|---|---|---|---|---|
| 2,017,352 | A | * | 10/1935 | Quick .................. | B66D 1/14 254/350 |
| 2,192,842 | A | * | 3/1940 | Schat .................. | B66D 1/26 254/305 |
| 2,448,674 | A | * | 9/1948 | Lawler ................. | B66D 1/16 254/305 |
| 2,652,230 | A | * | 9/1953 | Hoyle ................. | B66D 1/12 254/346 |
| 3,572,482 | A | * | 3/1971 | Kalpas ................ | F16D 67/02 192/15 |

(Continued)

FOREIGN PATENT DOCUMENTS

| | | |
|---|---|---|
| CN | 206407852 | 8/2017 |
| EP | 2581253 | 4/2013 |
| EP | 3144171 | 3/2017 |

OTHER PUBLICATIONS

European Patent Office, European Search Report dated Jul. 6, 2020 in Application No. 19214966.4.

*Primary Examiner* — Michael E Gallion
(74) *Attorney, Agent, or Firm* — Snell & Wilmer L.L.P.

(57) ABSTRACT

An auxiliary brake assembly for use in a hoist, is disclosed. The auxiliary brake assembly comprises a pinion, a fastener, and a clutch assembly. The pinion may comprise a mesh gear disposed proximate a respective mesh gear of a rotor gear. The clutch assembly may be disposed between the fastener and the mesh gear. The fastener may be configured to compress the clutch assembly in the event a cable drum of the hoist is free spinning. The compression of the clutch may lock the pinion and the rotor gear and stop the cable drum from spinning freely.

16 Claims, 4 Drawing Sheets

(56) References Cited

U.S. PATENT DOCUMENTS

| | | | | |
|---|---|---|---|---|
| 3,697,049 A * | 10/1972 | Wallace | | B66D 1/16 254/343 |
| 3,764,111 A * | 10/1973 | Dummer | | B66D 1/08 254/361 |
| 3,853,303 A * | 12/1974 | Wineburner | | F16D 55/02 254/345 |
| 3,912,229 A * | 10/1975 | Mitchell | | B66D 1/08 254/295 |
| 4,004,780 A * | 1/1977 | Kuzarov | | B66D 1/16 254/345 |
| 4,022,432 A * | 5/1977 | Toyomura | | B66D 1/16 254/297 |
| 4,093,034 A * | 6/1978 | Curley | | B66D 1/14 180/235 |
| 4,118,013 A * | 10/1978 | Christison | | B66D 5/14 192/223.2 |
| 4,120,486 A * | 10/1978 | Mehnert | | B66D 1/7415 192/18 R |
| 4,132,387 A * | 1/1979 | Somerville | | B66D 1/52 254/340 |
| 4,227,680 A | 10/1980 | Hrescak | | |
| 4,265,142 A * | 5/1981 | Watanabe | | F16H 3/40 242/350 |
| 4,312,497 A * | 1/1982 | Whaley | | B66D 1/22 254/344 |
| 4,358,088 A * | 11/1982 | House | | B66D 1/14 192/12 B |
| 4,426,064 A * | 1/1984 | Healy | | B66D 1/14 254/342 |
| 4,746,100 A | 5/1988 | Davenport et al. | | |
| 4,884,783 A * | 12/1989 | McIntosh | | B66D 1/14 254/343 |
| 5,513,723 A | 5/1996 | Luebke | | |
| 6,299,140 B1 * | 10/2001 | Kamljuk | | B66D 1/16 254/328 |
| 6,371,447 B1 * | 4/2002 | Imanishi | | B66D 1/44 254/361 |
| 6,834,758 B2 * | 12/2004 | Nguyen | | B65G 39/09 198/722 |
| 7,270,312 B1 * | 9/2007 | Phipps | | B66D 1/22 254/278 |
| 7,891,641 B1 * | 2/2011 | Miller | | B66D 1/16 254/346 |
| 9,017,219 B2 * | 4/2015 | Cahill | | B64C 25/405 477/170 |
| 9,815,551 B2 * | 11/2017 | Drennen | | B64C 25/36 |
| 9,988,249 B2 * | 6/2018 | Maghsoodi | | F16D 13/46 |
| 10,766,749 B2 * | 9/2020 | Fretz | | B66D 1/22 |
| 2003/0151037 A1 * | 8/2003 | O'Fallon | | B66D 1/16 254/344 |
| 2010/0065799 A1 * | 3/2010 | Zhou | | B66D 1/22 254/344 |
| 2010/0237306 A1 * | 9/2010 | Eschelbacher | | B66D 1/54 254/362 |
| 2014/0084229 A1 * | 3/2014 | Morrison | | B66D 3/20 254/344 |
| 2016/0068376 A1 * | 3/2016 | Fretz | | B66D 3/18 254/219 |
| 2016/0298705 A1 * | 10/2016 | Davies | | F16D 43/216 |
| 2016/0340159 A1 * | 11/2016 | Maghsoodi | | B66D 1/12 |
| 2018/0201486 A1 * | 7/2018 | Huang | | B66D 1/14 |
| 2018/0282124 A1 | 10/2018 | Watson et al. | | |
| 2020/0207596 A1 * | 7/2020 | Hausladen | | B66D 5/22 |

* cited by examiner

AUXILIARY BRAKE ASSEMBLY

FIELD

The present disclosure relates generally to hoists and, more particularly, to auxiliary brake assemblies for hoists.

BACKGROUND

Hoists are devices used to mechanically lift and/or lower loads (e.g., cargo, persons, etc.). Hoists may include a motor-driven cable drum around which a cable winds and/or unwinds. The hoist applies a pulling force to the load through the cable in order to control and/or move the load from one physical location to another physical location. Hoists are used in many environments, including aircraft, automobile, and truck applications, as well as anchor systems, cable cars, cranes, elevators, escalators, mine operations, moving sidewalks, rope tows, ski lifts, tethers, etc. A free spinning hoist can put the aircraft, the crew, the hoist, and/or the load at risk.

SUMMARY

An auxiliary brake assembly, in accordance with various embodiments, is disclosed herein. The auxiliary brake assembly comprises: a pinion having a first end, a second end and a mesh gear, the first end opposite the second end, and the mesh gear axially adjacent to the first end; a fastener including a flange extending radially outward from a radially outer surface of the fastener; and a clutch assembly coupled to the pinion and a grounded hub, the clutch assembly disposed between the fastener and the mesh gear.

In various embodiments, the auxiliary brake assembly may further comprise a spring disposed between the flange and the clutch assembly. The auxiliary brake assembly may further comprise a pressure plate disposed between the spring and the clutch assembly. The clutch assembly may further comprise a first plurality of friction discs coupled to a second pinion radially outer surface, a second plurality of friction discs coupled to the grounded hub, and a plurality of reaction plates interleaved between the second plurality of friction discs. The pinion may define a longitudinal axis, the pinion configured to spin about the longitudinal axis via engagement of the mesh gear of the pinion. The flange may be configured to compress the clutch assembly and lock the pinion. The fastener may include a male fastener and a female fastener, the female fastener comprising the flange, the male fastener coupled to the female fastener, and the female fastener disposed between the male fastener and the spring. The auxiliary brake assembly may further comprise a thrust bearing, wherein the male fastener has a groove disposed on an end of the male fastener, wherein the groove engages the thrust bearing.

A hoist, in accordance with various embodiments, is disclosed herein. The hoist comprises: a torque tube; a cable drum coupled to the torque tube; a rotor gear coupled to a first end of the torque tube, the rotor gear comprising a first mesh gear; an auxiliary brake assembly, comprising: a pinion having a second mesh gear engage the first mesh gear of the rotor gear; and a clutch assembly coupled to the pinion, the clutch assembly configured to lock the pinion when the cable drum is spinning freely.

The hoist may further comprise a main brake. The hoist may further comprise an electric motor configured to detect when the cable drum is spinning freely and activate the auxiliary brake assembly. The hoist may further comprise a first stage gear coupled to the electric motor. The hoist may further comprise a second stage gear coupled to the first stage gear. The auxiliary brake assembly may further comprise a fastener disposed axially adjacent to the clutch assembly, the fastener comprising a flange extending radially outward from a radially outer surface of the fastener, wherein the flange engages the second stage gear. The clutch assembly may further comprise a first plurality of friction discs coupled to a radially outer surface of the pinion, the first plurality of friction discs configured to lock the pinion. The fastener may comprise a male fastener and a female fastener, the female fastener disposed between the male fastener and the clutch assembly, the female fastener comprising the flange. The flange of the fastener may be configured to compress the clutch assembly and lock the first mesh gear and the second mesh gear when the cable drum is spinning freely.

A method of braking for a free spinning cable drum of a hoist, in accordance with various embodiments, is disclosed herein. The method comprises: detecting a cable drum is spinning freely; activating an electric motor coupled to an auxiliary brake assembly, the auxiliary brake assembly comprising a pinion engaging a rotor gear, and a clutch assembly coupled to the pinion, the pinion spinning freely; clamping the clutch assembly; and locking the pinion.

In accordance with various embodiments, the method may further comprise: locking the rotor gear. The method may further comprise: locking the cable drum.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

This detailed description of exemplary embodiments references the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Cross hatching and surface lines may be used throughout the figures to denote different parts but not necessarily to denote the same or different materials.

An auxiliary brake assembly for a hoist is disclosed herein. The auxiliary brake assembly may be configured to prevent a cable drum of a hoist from spinning freely. In accordance with various embodiments, the auxiliary brake assembly may include a pinion, a friction disc pack, a pressure plate, a gear nut, a screw, and a bearing. An auxiliary brake assembly may allow for a safer hoist, as compared to conventional hoist designs, which tend to employ a main brake assembly without an additional auxiliary brake assembly.

Figure 1:
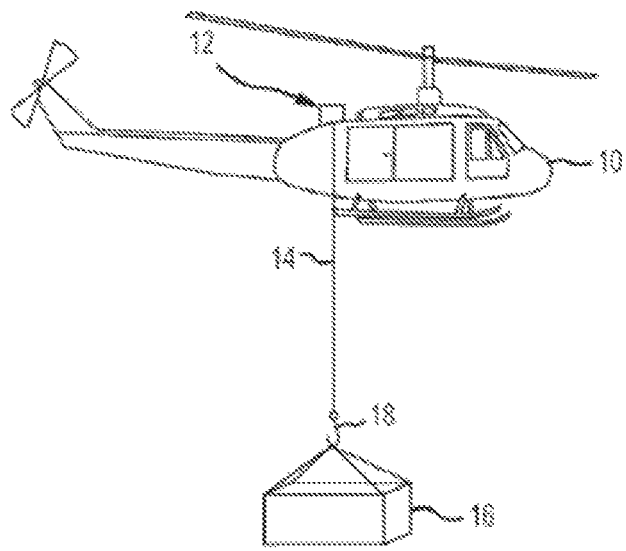
FIG. 1 illustrates an aircraft having a hoist, in accordance with various embodiments.

Referring now to FIG. 1, an aircraft 10, such as a helicopter, is illustrated, in accordance with various embodiments. Aircraft 10 may be used for search and rescue missions. A hoist 12 is attached to a support of aircraft 10. Hoist 12 may be used to extend and/or retract (e.g., lower and/or raise, respectively) a cable 14 (e.g., a wire-rope) connected to a load 16 via a hook 18 and/or the like. In various embodiments, the load 16 placed on the hoist 12 can exceed a load rating for the hoist 12, thereby putting the aircraft 10, the hoist 12, and/or the load 16, etc. at risk.

Figure 2:
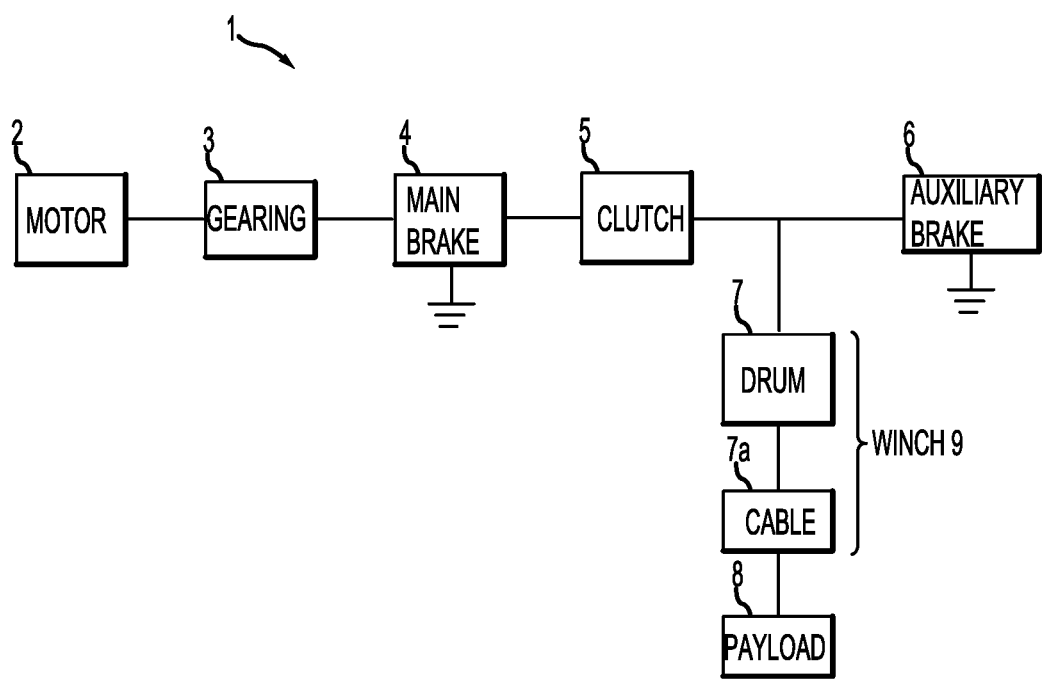
FIG. 2 illustrates a schematic block diagram of a hoist, in accordance with various embodiments.

Referring now also to FIG. 2, a schematic block diagram of a brake system 1 for a hoist 12 is illustrated, in accordance with various embodiments. A motor 2 is operatively connected to a brake 4 through gearing 3, which is operatively connected to the clutch 5, which is operatively connected to a drum 7. The motor 2 is activated to provide drive to the drum 7 through the gearing 3, the brake 4, the clutch 5, to wind up (or release) a winch cable 7a to lift (or drop) a payload 8. The drum 7 and the cable 7a together form a winch 9. The main brake 4 is grounded to a structure to stop cable 7a winding without disengaging the motor 2, whereas the clutch 5 acts as a moderating the drive, allowing the drum 7 to be disconnected from the motor 2 should the drum 7 become overloaded. An auxiliary brake 6 is grounded to a structure to stop cable 7a from winding in the event the main brake 4 is unable to stop the unwinding of cable 7a.

Figure 3:
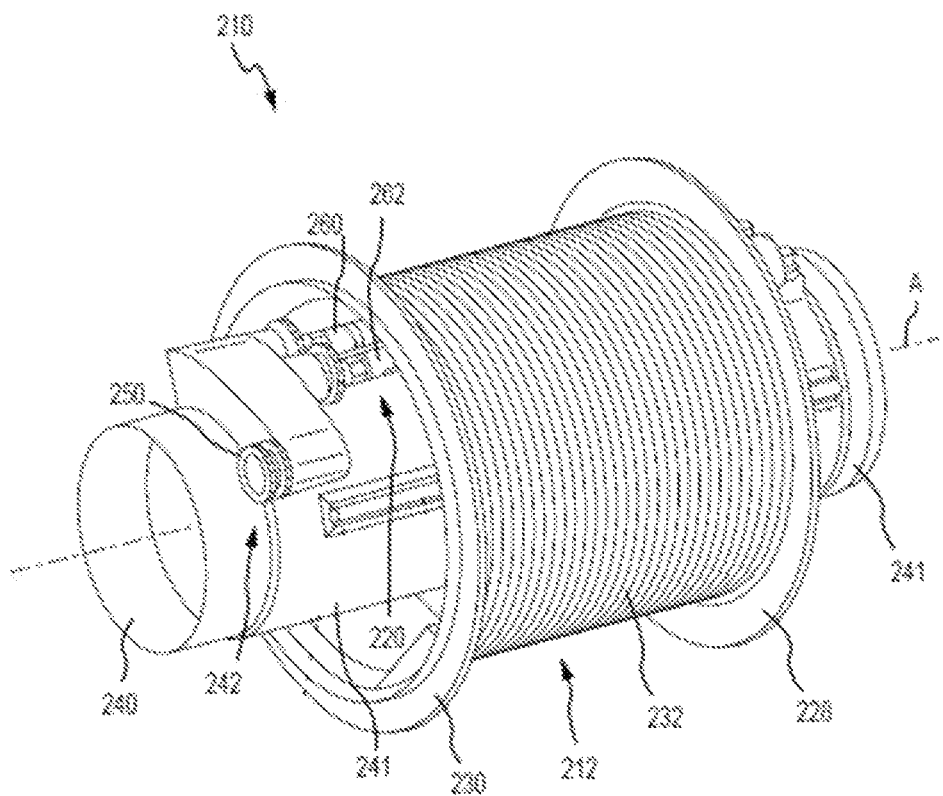
FIG. 3 illustrates a perspective view of a hoist, in accordance with various embodiments.

Referring now to FIG. 3, a perspective view of a rescue hoist, in accordance with various embodiments, is depicted. The rescue hoist 210 includes a cable drum 212, having a first radial flange 228, a second radial flange 230 and a barrel 232 extending axially between the first radial flange 228 and the second radial flange 230. In various embodiments, the cable drum 212 is disposed radially outward of a torque tube 240, within which a motor and a drive mechanism may be at least partially housed. In various embodiments, both the torque tube 240 and the cable drum 212 are configured to rotate about a longitudinal axis A. The cable drum 212 is also configured to translate back and forth with respect to the longitudinal axis A.

The rescue hoist 210 includes a speed reduction mechanism 242, which may, in various embodiments, include or be coupled to a planetary gear 250 configured to be driven by a ring gear disposed radially outward of the torque tube 240 and driven by a motor and a drive train. The speed reduction mechanism 242 may also be coupled to a level wind mechanism 220. In various embodiments, the level wind mechanism 220 includes a first screw 260 and a second screw 262, both screws extending axially along a radially outer surface 241 of the torque tube 240.

Figure 4:
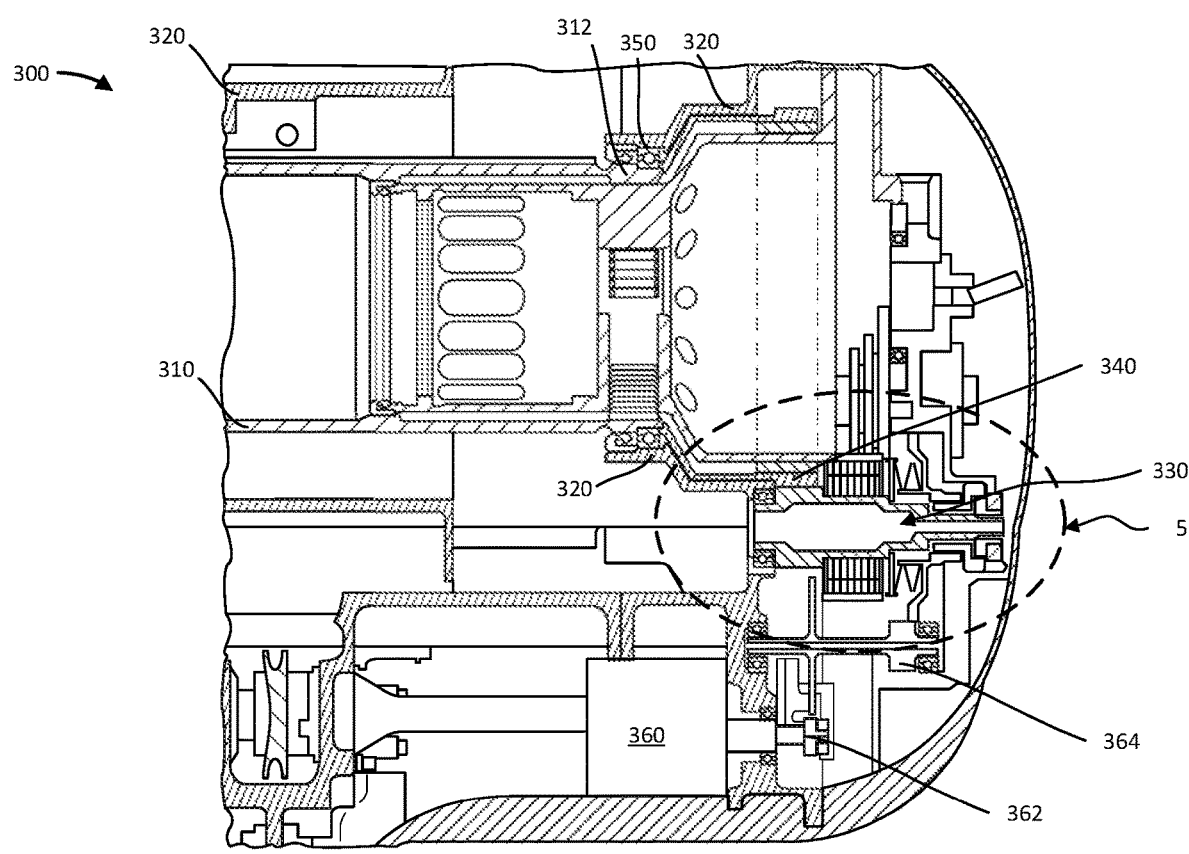
FIG. 4 illustrates a cross-section view of a hoist, in accordance with various embodiments.

Referring now to FIG. 4, a cross-sectional view of a rescue hoist along longitudinal axis A, in accordance with various embodiments, is depicted. Hoist 300 includes torque tube 310 and cable drum 320. In various embodiments, a gear box outputs torque to torque tube 310 and drives the cable drum 320 and rotates cable drum 320 about its longitudinal axis. Torque tube 310 is coupled to cable drum 320 by any method known in the art. For example, torque tube 310 may be coupled to cable drum 320 at a first end 312 of torque tube 310 by a ball bearing assembly 350. The ball bearing assembly 350 may reduce rotational friction between the torque tube 310 and the cable drum 320.

In various embodiments, hoist 300 further comprises an auxiliary brake assembly 330. Auxiliary brake assembly 330 is configured to stop cable drum 320 in the event that cable drum 320 is spinning freely. In various embodiments, auxiliary brake assembly 330 is coupled to a rotor gear 340. In various embodiments, rotor gear 340 is a spur gear having teeth projecting parallel to an axis of the rotor gear 340. The auxiliary brake assembly 330 is configured to lock the rotor gear 340 which locks the torque tube 310, which in turn locks the cable drum 320 in the event the cable drum begins to spin freely.

In various embodiments, hoist 300 further comprises an electric motor 360. Electric motor 360 may be in electrical communication with a brake controller. The Brake controller may detect a free spinning event by the cable drum and send an electrical signal to electric motor. Upon receiving a signal from a brake controller, electric motor 360 drives a first stage gear 362 disposed aft of the electric motor 360. First stage gear 362 may be coupled to a second stage gear 364. Second stage gear 364 may be coupled to auxiliary brake assembly 330. First stage gear 362 may engage second stage gear 364 and cause auxiliary brake assembly 330 to translate forward, lock the rotor gear 340, and stop the cable drum 320 from spinning. In various embodiments, first stage gear 362 and second stage gear 364 are cluster gears.

Figure 5:
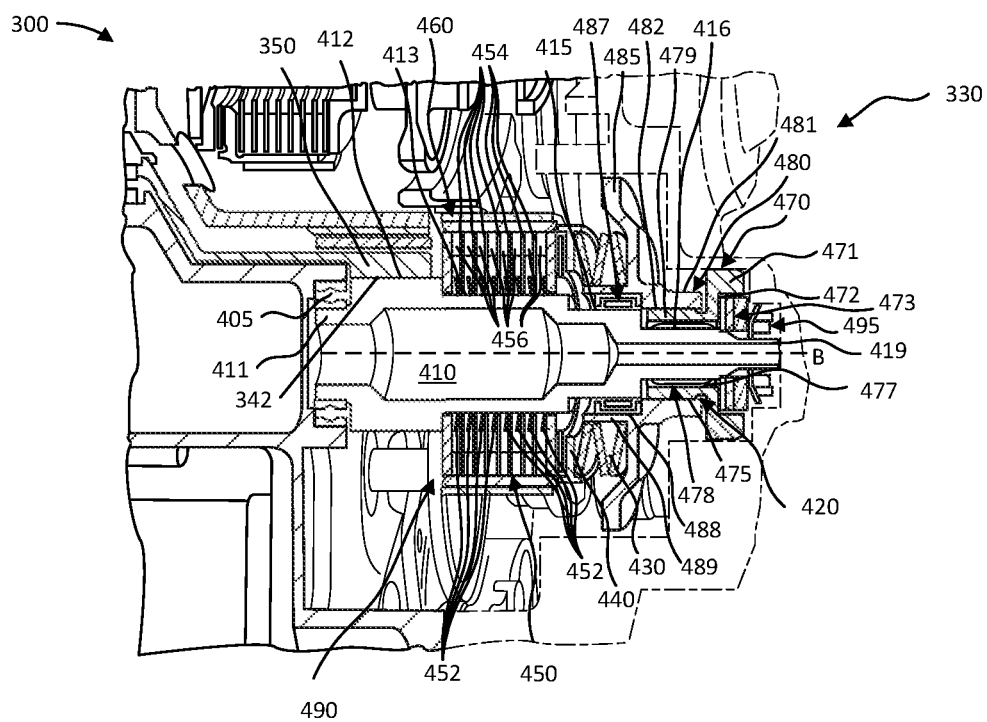
FIG. 5 illustrates a detail cross-section view of an auxiliary brake assembly from the hoist of FIG. 4, in accordance with various embodiments.

Referring now to FIG. 5, a detail perspective view of a cross-section of auxiliary brake assembly 330 of hoist 300, in accordance with various embodiments, is depicted. In various embodiments, the auxiliary brake assembly 330 comprises a pinion 410, a fastener 420, spring 430, a pressure plate 440, a clutch assembly 450, and a hub 460. The pinion 410 is disposed radially adjacent from the rotor gear 340. In various embodiments, the pinion 410 may be disposed radially outward from rotor gear 340 or radially inward from rotor gear 340. The pinion comprises a first end 411 and a second end 419. The first end 411 may comprise a shoulder and be configured to receive a bearing 405. Bearing 405 may be configured to reduce rotational friction of pinion 410, support radial loads, and/or support axial loads. Bearing 405 may comprise a ball bearing, or the like.

The pinion 410 further comprises a mesh gear 412 configured to engage a respective mesh gear 342 of rotor gear 340 during normal operation of hoist 300. A first radially outer surface 413 of pinion 410 may be disposed axially adjacent to mesh gear 412. The pinion 410 may further comprise a second radially outer surface 415 disposed axially adjacent to the first radially outer surface 413 and a third radially outer surface 416 disposed axially adjacent to second radially outer surface 415. The pinion 410 may rotate about a pinion axis B during normal operation as rotor gear 340 rotates about longitudinal axis A (from FIG. 3) of the hoist 300 via engagement between mesh gear 412 and respective mesh gear 342.

In various embodiments, fastener 420 may comprise a male fastener 470 and a female fastener 480. Male fastener 470 may be disposed axially adjacent to, and engage, female fastener 480. Male fastener 470 comprises a first end 471 and a second end 479 disposed opposite the first end 471. Male fastener 470 may comprise a threaded portion 475 disposed at the second end 479 of male fastener 470. Male fastener 470 may further comprise an aperture extending axially from first end 471 to second end 479. Male fastener 470 may comprise a radially inner surface 477 opposite threaded portion 475 and defined by the aperture. The radially inner surface 477 may be configured to engage a bearing 478. In various embodiments, bearing 478 may be a needle bearing, or any other bearing commonly known in the art. In various embodiments, male fastener 470 may comprise a groove 472 disposed at first end 471. The groove 472 may be configured to receive a bearing 473. Bearing 473 may be disposed within groove 472 and coupled to pinion 410 proximate the second end 419 of pinion 410. Bearing 473 may comprise a thrust bearing, or any other bearing known in the art. Bearing 473 may be configured to support high axial loads and/or the like.

In various embodiments, female fastener 480 comprises a gear nut. Female fastener comprises a first end 481 and a second end 489 opposite the first end 481. First end 481 may comprise a threaded portion 482 disposed on a radially inner surface of first end 481. The threaded portion 482 may be configured to received threaded portion 475 of male fastener 470. Second end 489 may comprise a groove 488 disposed on a radially inner surface of the second end 489 and a radially outer surface disposed opposite the radially inner surface. The female fastener 480 may further comprise a flange 485 extending radially outward from the radially outer surface of second end 489. The groove 488 may be configured to receive a bearing 487. Bearing 487 may be disposed between groove 488 and second radially outer surface 415 of pinion 410. In various embodiments, bearing 487 may be a roller bearing, or the like. In various embodiments, bearing 487 may be configured to provide radial load support to auxiliary brake assembly 330.

In various embodiments, spring 430 is disposed between flange 485 of female fastener 480 and pressure plate 440. In various embodiments, spring 430 comprises a cupped spring washer, a coil spring, a nested wave spring, or any other spring known in the art. In various embodiments, pressure plate 440 is disposed between spring 430 and clutch assembly 450. During a hoist free spinning event, flange 485 of female fastener 480 translates towards pressure plate 440 and compresses spring 430. Spring 430 may then apply a force to clutch assembly 450 and compress clutch assembly 450. A "hoist free spinning event," as described herein, refers to an event where a cable drum of a hoist 300 is spinning freely, such as when a cable starts to real out if the system is unable to oppose the mechanical force exerted on the cable. This may occur if one of the components becomes non-operational.

In various embodiments, clutch assembly 450 comprises a first plurality of friction discs 452, a second plurality of friction discs 454, and a plurality of reaction plates 456. In various embodiments, clutch assembly 450 is lubricated with oil (e.g., a wet assembly). Clutch assembly 450 is disposed axially between mesh gear 412 of pinion 410 and pressure plate 440. Clutch assembly 450 is disposed radially between first radially outer surface 413 of pinion 410 and hub 460. The first plurality of friction discs 452 may be coupled to a first radially outer surface 413 of pinion 410. The first plurality of friction discs 452 extend radially outward from first radially outer surface 413 of pinion 410. In various embodiments, each friction disc in the second plurality of friction discs 452 are coupled to, and extend radially inward from, the hub 460 towards first radially outer surface 413 of pinion 410. In various embodiments, the hub 460 is grounded to structure 490. The plurality of reaction plates 456 may be interleaved between the first plurality of friction discs 452 and/or the second plurality of friction discs 454. In various embodiments, there may be an equal number of first plurality of friction discs 452 and the second plurality of friction discs 454. In various embodiments, there may be a different number of first plurality of friction discs 452 and second plurality of friction discs 454. When in use, the first plurality of friction discs 452 and the second plurality of friction discs 454 are clamped and create a torque between the pinion 410 and the hub 460, locking the pinion 410, and in turn, locking the rotor gear 340.

In various embodiments, the auxiliary brake assembly 330 further comprises a nut 495 disposed at the second end 419 of pinion 410. The nut 495 mechanically couples the auxiliary brake assembly 330 together. In various embodiments, the nut 495 is configured to spin with the pinion 410 during normal operation. In various embodiments, with reference now to FIGS. 4 and 5, flange 485 of female fastener 480 may be coupled to second stage gear 364 by any method known in the art.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An auxiliary brake assembly comprising:
a pinion having a first end, a second end, and a mesh gear, the first end opposite the second end, and the mesh gear axially adjacent to the first end;
a fastener including a flange extending radially outward from a radially outer surface of the fastener; and
a clutch assembly coupled to the pinion and a grounded hub, the clutch assembly disposed between the fastener and the mesh gear, wherein the clutch assembly further comprises a first plurality of friction discs coupled to a second pinion radially outer surface of the pinion, a second plurality of friction discs coupled to the grounded hub, and a plurality of reaction plates interleaved between the second plurality of friction discs.

2. The auxiliary brake assembly of claim 1, further comprising a spring disposed between the flange and the clutch assembly.

3. The auxiliary brake assembly of claim 2, further comprising a pressure plate disposed between the spring and the clutch assembly.

4. The auxiliary brake assembly of claim 1, wherein the pinion defines a longitudinal axis, the pinion configured to spin about the longitudinal axis via engagement of the mesh gear of the pinion.

5. The auxiliary brake assembly of claim 4, wherein the flange is configured to compress the clutch assembly and lock the pinion.

6. The auxiliary brake assembly of claim 3, wherein the fastener includes a male fastener and a female fastener, the female fastener comprising the flange, the male fastener coupled to the female fastener, and the female fastener disposed between the male fastener and the spring.

7. The auxiliary brake assembly of claim 6, further comprising a thrust bearing, wherein the male fastener has a groove disposed on an end of the male fastener, wherein the groove engages the thrust bearing.

8. A hoist, comprising:
a torque tube;
a cable drum coupled to the torque tube;
a rotor gear coupled to a first end of the torque tube, the rotor gear comprising a first mesh gear;
an electric motor configured to detect when the cable drum is spinning freely and activate an auxiliary brake assembly;
a first stage gear coupled to the electric motor;
a second stage gear coupled to the first stage gear; and
the auxiliary brake assembly, comprising:
a pinion having a second mesh gear engage the first mesh gear of the rotor gear;
a clutch assembly coupled to the pinion, the clutch assembly configured to lock the pinion when the cable drum is spinning freely; and
a fastener disposed axially adjacent to the clutch assembly, the fastener comprising a flange extending radially outward from a fastener radially outer surface of the fastener, wherein the flange engages the second stage gear.

9. The hoist of claim 8, further comprising a main brake.

10. The hoist of claim 8, wherein the clutch assembly comprises a first plurality of friction discs coupled to a pinion radially outer surface of the pinion, the first plurality of friction discs configured to lock the pinion.

11. The hoist of claim 8, wherein the fastener comprises a male fastener and a female fastener, the female fastener disposed between the male fastener and the clutch assembly, the female fastener comprising the flange.

12. The hoist of claim 8, wherein the flange of the fastener is configured to compress the clutch assembly and lock the first mesh gear and the second mesh gear when the cable drum is spinning freely.

13. A method of braking for a free spinning cable drum of a hoist, the method comprising:
detecting a cable drum is spinning freely;
activating an electric motor coupled to an auxiliary brake assembly, the auxiliary brake assembly comprising a pinion engaging a rotor gear, and a clutch assembly coupled to the pinion and a grounded hub and disposed between a fastener and a mesh gear of the pinion, the pinion spinning freely, the clutch assembly comprising:
a first plurality of friction discs coupled to a second pinion radially outer surface of the pinion, a second plurality of friction discs coupled to the grounded hub, and a plurality of reaction plates interleaved between the second plurality of friction discs;
clamping the clutch assembly; and
locking the pinion.

14. The method of claim 13, further comprising locking the rotor gear.

15. The method of claim 14, further comprising locking the cable drum.

16. An auxiliary brake assembly comprising:
a pinion having a first end, a second end and a mesh gear, the first end opposite the second end, and the mesh gear axially adjacent to the first end;
a fastener including a flange extending radially outward from a radially outer surface of the fastener;
a clutch assembly coupled to the pinion and a grounded hub, the clutch assembly disposed between the fastener and the mesh gear;
a spring disposed between the flange and the clutch assembly; and
a pressure plate disposed between the spring and the clutch assembly, wherein:
the fastener includes a male fastener and a female fastener,
the female fastener comprises the flange,
the male fastener is coupled to the female fastener, and
the female fastener disposed between the male fastener and the spring.

* * * * *